Feb. 16, 1960 — D. R. PIERCE — 2,924,987
CONTROL APPARATUS
Filed April 28, 1958 — 2 Sheets-Sheet 1
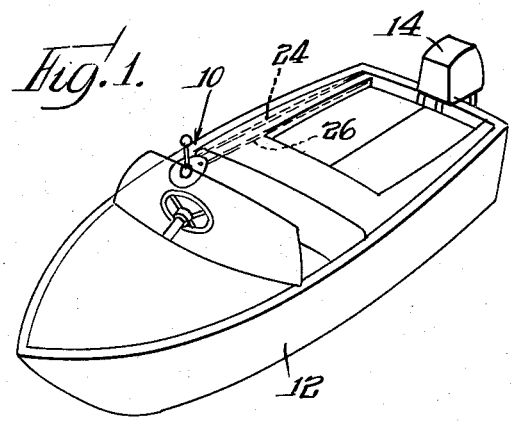
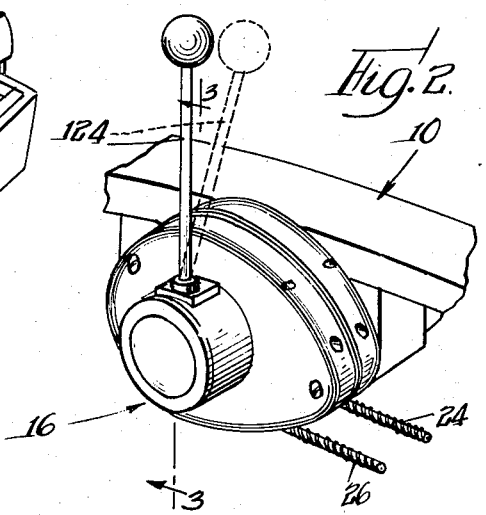
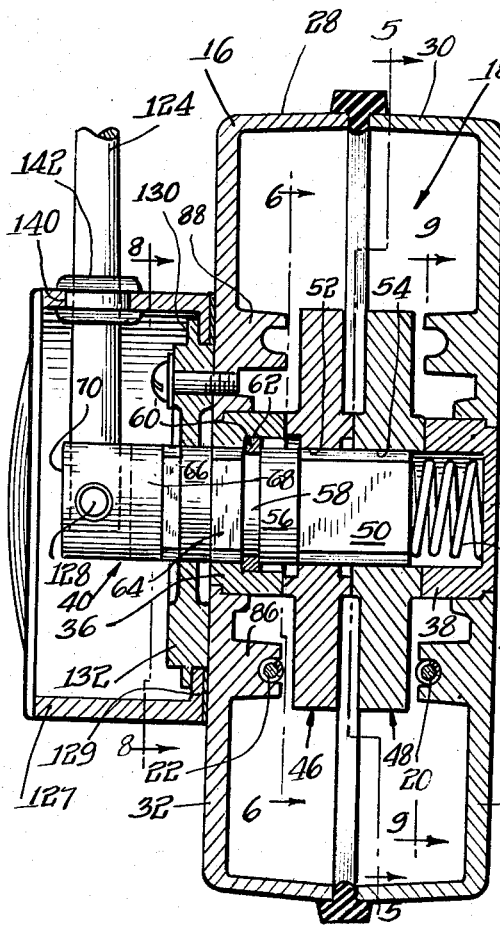
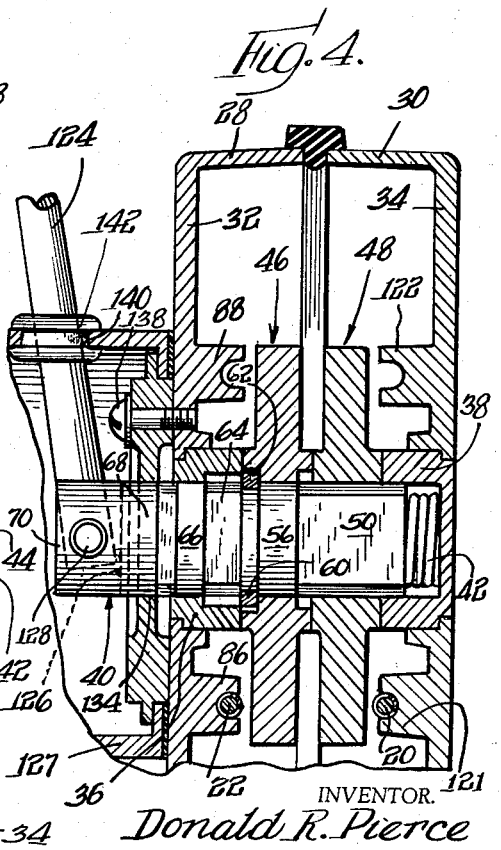
INVENTOR.
Donald R. Pierce
BY Olson & Trexler
attys.

Feb. 16, 1960  D. R. PIERCE  2,924,987
CONTROL APPARATUS
Filed April 28, 1958  2 Sheets-Sheet 2
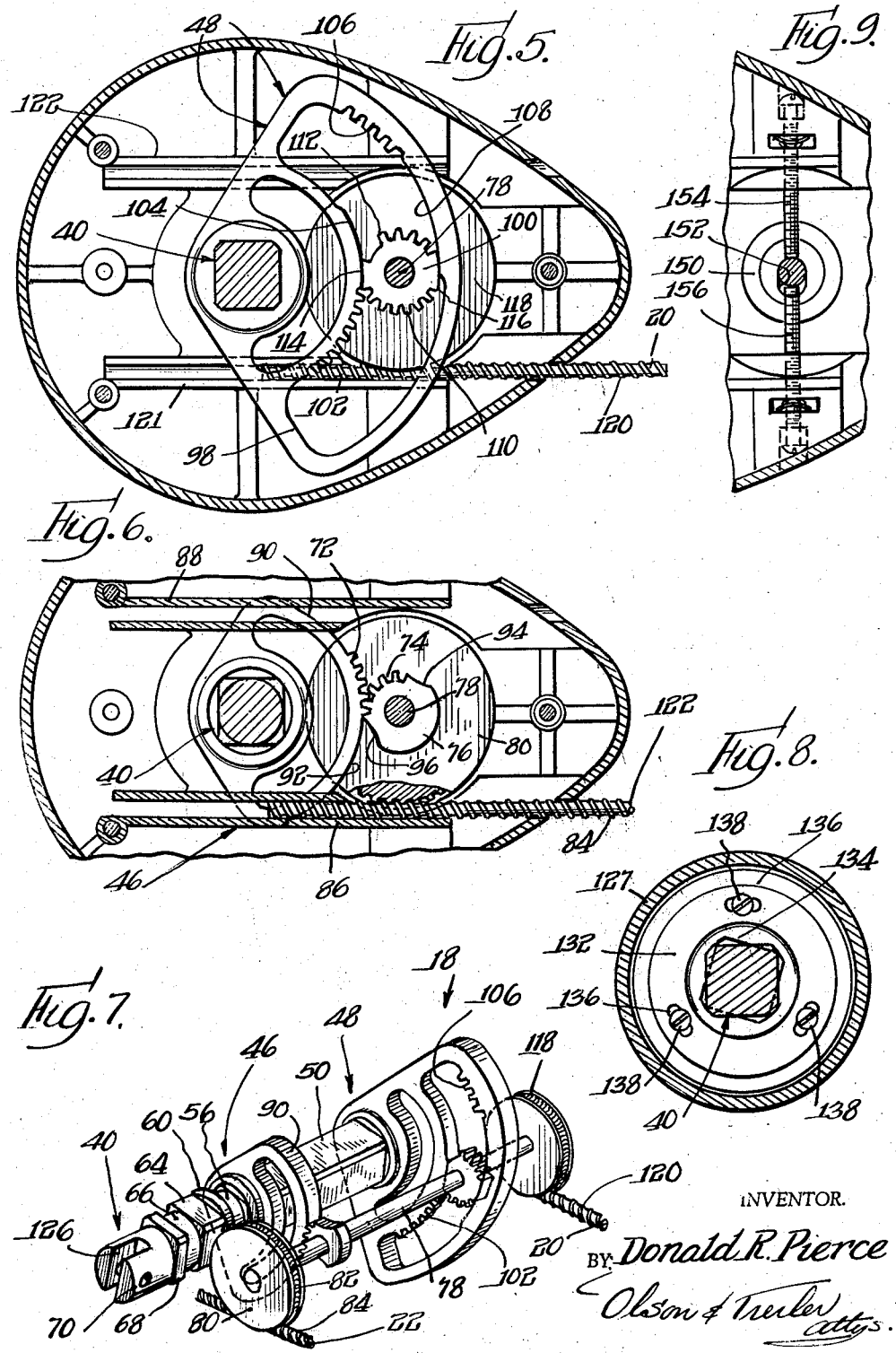
INVENTOR.
BY Donald R. Pierce
Olson & Trexler
attys.

United States Patent Office 2,924,987
Patented Feb. 16, 1960

2,924,987

CONTROL APPARATUS

Donald R. Pierce, Ambler, Pa., assignor to Teleflex Incorporated, North Wales, Pa., a corporation of Delaware Application April 28, 1958, Serial No. 731,444

10 Claims. (Cl. 74—472)

The present invention relates to a novel control apparatus, and more particularly to novel control means adapted to manipulate a plurality of devices.

While controls incorporating features of the present invention may be adapted for various purposes, they are especially suitable for actuating gear shift and throttle mechanisms of marine engines. In order to facilitate the present disclosure, a control means will be described with particular reference to its use for actuating the gear shift and throttle mechanisms of an outboard motor.

As will be understood, an outboard motor gear shift mechanism is usually located in a neutral position during starting of the motor while at the same time the throttle is slightly advanced or opened. Furthermore, it is frequently desirable such, for example, as during warm-up operation of the motor to manipulate the throttle without actuating the gear shift mechanism. Of course, after the gear shift mechanism has been shifted from the neutral position to either forward or reverse positions, it is necessary to be able to operate the throttle without further movement of the gear shift mechanism at least, until such movement is desired. Heretofore these results have been obtained by providing control means wherein essentially separate control mechanisms utilizing different control levers or actuating members have been provided for operating a motor gear shift and throttle. Such controls utilizing two actuating levers frequently make the operation and maneuvering of a boat relatively inconvenient and difficult. Single lever control means have been proposed, but certain of these mechanisms have been relatively complicated and expensive to manufacture and not entirely suitable for many installations.

An important object of the present invention is to provide a novel control apparatus constructed so as to include only a single operating lever or member for actuating a plurality of devices, which apparatus is of relatively rugged and economical construction and may be easily installed and operated.

A further object of the present invention is to provide a novel single lever gear shift and throttle control apparatus which may be used in connection with substantially any desired presently available outboard motor.

A more specific object of the present invention is to provide a novel single lever gear shift and throttle control apparatus which is constructed so that the throttle may be actuated with or without manipulation of the gear shift mechanism, which apparatus is further constructed so that the gear shift mechanism may be actuated only when the throttle is in a substantially predetermined retarded position.

Other objects and advantages of the present invention will become apparent from the following description and the accompanying drawings wherein:

Fig. 1 is a perspective view showing an outboard motor boat on which a control system or apparatus incorporating the features of the present invention is installed;

Fig. 2 is an enlarged fragmentary perspective view of control apparatus incorporating features of the present invention;

Fig. 3 is a further enlarged partial sectional view taken generally along the line 3—3 in Fig. 2;

Fig. 4 is a fragmentary sectional view similar to Fig. 3 but shows elements of the apparatus shifting to different operative positions;

Fig. 5 is a sectional view taken along line 5—5 in Fig. 3;

Fig. 6 is a fragmentary sectional view taken along line 6—6 in Fig. 3, but omits gear elements shown in Fig. 5 so as to clarify the disclosure;

Fig. 7 is a schematic perspective view showing gear means of an apparatus incorporating the features of the present invention;

Fig. 8 is a fragmentary sectional view taken generally along line 8—8 in Fig. 3; and Fig. 9 is a fragmentary sectional view taken generally along line 9—9 in Fig. 3.

Referring now more specifically to the drawings wherein like parts are designated by the same numerals throughout the various figures, a control apparatus 10 is shown which is adapted to be installed on a boat 12 for actuating throttle and gear shift mechanisms of an outboard motor 14. The control means or apparatus 10 comprises a housing 16 adapted to be mounted at any convenient location, which housing contains and supports actuating mechanism generally designated by the numeral 18. Push-pull elements or cables 20 and 22 extend from the actuating mechanism 18 and are respectively connected with the gear shift and throttle devices, not shown, of the motor 14 so that these devices will be operated in the desired manner when the flexible cables are advanced or retracted by the actuating mechanism 18 in the manner described below. In order to confine the cables 20 and 22 so as to enable them to transmit compression as well as tension loads, guide conduits 24 and 26 are provided, which conduits respectively slidably receive and extend for substantially the entire length of the cables 20 and 22.

The housing 16 comprises a pair of complementary members 28 and 30 having opposite end walls 32 and 34 provided with axially aligned apertures in which bushings 36 and 38 are respectively rotatably mounted. A shaft 40 extends through the bushing 36 and into the bushing 38, which shaft is normally resiliently biased to the position shown in Fig. 3 by a spring 42 compressed between the shaft and a closed end section 44 of the bushing 38. It is to be noted however, that the shaft is axially slidable within the bushings to and from the positions shown in Figs. 3 and 4.

The actuating means 18 which is shown in Figs. 3–6 and somewhat schematically in Fig. 7 includes the above mentioned shaft 40 and a pair of gear sectors 46 and 48 mounted on the shaft. It is to be noted that the shaft 40 has a first section 50 having a non-circular or rectangular cross section and the gear sectors 46 and 48 are provided with non-circular or rectangular aligned apertures 52 and 54 through which the shaft section 50 axially and slidably extends. However, the non-circular or square configuration of the shaft section 50 and the complementary apertures 52 and 54 prevents relative rotation between the gear sectors and the shaft when the shaft is in the position in Fig. 3. It is important to note that the shaft 40 includes another portion 56 immediately adjacent the rectangular section 50, which portion 56 has a circular transverse cross section with a diameter equal to the distance between opposite sides of the rectangular or square section 50. The circular portion 56 has an axial length at least substantially as great as the thickness of the gear sector 46 so that when the shaft 40 is shifted axially to the position shown in Fig. 4, the rectangular shaft section 50 is completely disengaged from the gear sector 46 and the circular shaft portion 56 is disposed within and supports the gear sector 46. When the circular portion 56 is within the gear sector 46, relative rotation may take place between the shaft and the gear sector 46.

In order to limit movement of the shaft 40 toward the left as viewed in Fig. 3, a groove 58 is provided in the shaft adjacent the circular shaft portion 56 and a snap ring 60 is mounted in the groove for engagement with an internal shoulder 62 provided in the bushing 36. Next to the groove 58, the shaft is provided with an axially short substantially rectangular or square section 64 which is adapted to slide through a complementary square aperture in the end of the bushing 36 when the shaft is shifted to and from the position shown in Figs. 3 and 4. Another short section 66 of the shaft adjacent the section 64 is provided with a round cross sectional shape, and this section merges with still another axially short generally rectangular or square section 68. An outer end portion 70 of the shaft is provided with a round transverse cross sectional shape. The particular construction of the shaft 40 just described enables the shaft to be rotated when it is in either of the positions shown in Figs. 3 and 4 but prevents the shaft from being axially shifted until it has been rotated to a predetermined position as will be described more fully below.

As shown in Figs. 6 and 7, the gear sector 46 is provided with a peripherally short segment having gear teeth 72 formed thereon. These teeth are adapted to mesh with a correspondingly peripherally short tooth segment 74 of a pinion 76 rotatably supported within the housing on a shaft 78. Fixed to or formed integrally with the pinion 76 is a gear 80 cooperable with the cable 22 for axially shifting the cable upon rotation of the gear sector 46 and thus the gear 80. In order to provide a driving connection between the gear or wheel 80 and the motion transmitting element or cable 22, the gear 80 is provided with peripheral teeth 82 adapted to mesh with axially spaced protuberance or thread means 84 forming a part of the cable 22, which thread means may be provided by a wire having spaced helical coils wrapped around a central core portion of the cable. Guide means shown in Figs. 3, 4 and 6 is provided along the end wall 32 of the housing member 28 for retaining an end portion of the cable 22 in engagement with the periphery of the gear or wheel 80. The guide means 86 is located so that the cable 22 is directed tangentially to and beneath the wheel or gear 80. Certain presently available outboard motors are constructed so that the gear shift elements must be pulled in one direction and pushed in the other respectively for shifting into forward and reverse, and other presently commercially available motors are constructed so that their shift mechanisms must be oppositely actuated for shifting to forward and reverse. Therefore, in order to adapt the control apparatus of the present invention for use with both types of motors, a second guideway 88 is provided on the end wall 32 of the housing member 28, which guideway is disposed for directing the cable substantially tangentially to and over the wheel or gear member 80. The cable 22 and its associated guide conduit may be selectively connected with either the guideway 86 or the guideway 88 in accordance with the requirements of the outboard motor which is to be controlled.

Referring particularly to Figs. 6 and 7, it is seen that the gear sector 46 is provided with smooth arcuate surface sections 90 and 92 at opposite sides of the tooth sector 72. The pinion 76 is provided with complementary concave smooth surface sections 94 and 96 at the opposite sides of its toothed sector 74. The arrangement is such that the gear sector 46 is operative for rotating the pinion while the toothed segments 72 and 74 are in engagement so as to selectively actuate the motor gear shift mechanism either to forward or reverse positions. When the shifting operation is completed either the surface 94 or the surface 96 will come into engagement with the arcuate surfaces 90 and 92 respectively so that the pinion will be locked against further rotation until, of course, the direction of movement of the gear sector is reversed. However, the gear sector is free for continued pivotal movement in the original direction so that the throttle mechanism of the outboard motor may be freely actuated while the gear shift mechanism is locked in the desired shifted position as will be described more fully below.

As shown in Figs. 5 and 7, the gear sector 48 is provided with an elongated arcuate slot 98 in which a pinion 100 is rotatably supported by the shaft 78 which extends between the opposite sides of the housing. The gear sector 48 has an outwardly facing arcuate surface defining one side of the slot 98, which surface has a toothed sector 102 adjacent one end thereof and a smooth segment 104 extending toward the opposite end thereof. The slot 98 is partially defined by an inwardly facing arcuate surface having a toothed segment 106 adjacent an end thereof opposite from the tooth segment 102. The outwardly facing surface also has a smooth section 108 extending from the toothed section 106. The pinion 100 is provided with oppositely disposed toothed sections 110 and 112 which are respectively adapted to mesh with the toothed sections 102 and 106. The toothed sections of the pinion are separated by smooth surface locking sections 114 and 116. The section 114 has a concave surface complementary to the smooth surface section 104 of the gear sector, and the pinion section 116 has a smooth convex surface complementary to the smooth surface section 108 of the gear sector. When the smooth surface sections of the pinion engage their complementary smooth sections on the gear sector 48, the pinion which is operatively connected with the motor throttle mechanism is locked against rotation and the motor throttle is locked in an idling position. It is to be noted that when the gear sector 48 is rotated counterclockwise as viewed in Fig. 5 the toothed segment 102 will mesh with the pinion toothed segment 110 so as to rotate the pinion in a clockwise direction, and when the gear sector 48 is rotated in a clockwise direction the pinion 100 will still be rotated in a clockwise direction upon engagement of the toothed segment 106 with the pinion toothed segment 112. In other words, the arrangement is such that regardless of which way the shaft 40 is rotated, the outboard motor throttle will be opened upon movement of the shaft and the gear sector 48 away from a central neutral position.

A gear or wheel 118 having peripheral teeth similar to the above described gear 80 is secured to or formed integrally with the pinion 100. The gear 118 is adapted to mesh with a wire 120 forming a part of the cable 20 and having spaced helical convolutions so that upon rotation of the wheel 118 the cable 20 will be axially shifted for actuating the motor throttle mechanism. As shown in Figs. 3, 4 and 5, guide means 121 is provided along the end wall of the housing member 30 for directing the cable 20 tangentially to and beneath the gear 118. Additional guide means 122 is provided for selectively receiving the cable 20 and directing the cable tangentially to and above the gear 118 so that the control means may be used in connection with various outboard motors or other devices which are actuated by pushing or pulling an element in different directions.

In order to actuate the shaft 40, the apparatus is provided with an operating member or lever 124 having an end projecting into a slot 126 formed in the end portion 70 of the shaft 40 and pivotally connected to the shaft by a pin 128. The handle or lever 124 is supported for pivotal or rotated movement about the axis of the shaft 40 and in a plane perpendicular to this axis by a cylindrical support member 127. The cylindrical support member 127 is mounted for rotation relative to the housing and this is accomplished by providing the cylindrical support member 127 with an inturned flange 129 which projects beneath a peripheral radially extending flange 130 of a plate member 132 secured to the end wall 32 of the housing member 28. As shown in Figs. 3, 4 and 8, the plate member 132 is provided with a non-circular or square central aperture 134 through which the square portion 68 of the shaft may be shifted in the manner and for the purpose set forth below. In addition, the plate member 132 is provided with a plurality of elongated arcuate slots 136 through which mounting screws 138 extend so that the plate member may be rotatably adjusted for the purpose described below.

The operating handle or lever 124 extends through an oversized aperture 140 in the cylindrical members 127. A grommet 142 formed from the rubber or any other suitable resilient material is mounted within the aperture 140 and normally retains the lever 124 in a generally central location within the aperture. However, the oversized aperture 140 and the resilient grommet 142 permit the lever 124 to be pivoted in a plane containing the axis of the shaft 40 and about fulcrum means provided by the grommet 142 for axially shifting the shaft 40 as shown in Fig. 4.

In order to facilitate initial assembly of the cables 20 and 22 with their associated gears of their actuating mechanism 18, means is provided for mounting the shaft 78 in a manner which permits the shaft and thus the gears 80 and 118 to be adjusted transversely of the above mentioned cable guide means. Referring to Fig. 9, an insert 150 is mounted in a suitable recess provided in the end wall 34 of the housing member 30, which insert has an elongated slot 152 for receiving an end of the shaft 78. Screws 154 and 156 are threaded through suitable apertures provided in the housing member 30 for adjustably positioning the shaft 78 in the slot 152. An insert and screws respectively identical to the insert 150 and screws 154 and 156 are provided in the housing member 28 for supporting an end of the shaft 78 opposite from the insert 150.

A résumé of the operation of the apparatus of this invention is as follows. Starting with the control lever 124 and the various elements of the mechanism 18 in the neutral positions shown in Fig. 7 and in broken lines in Fig. 2, assume that it is desired to actuate the gear shift mechanism of the motor 14 to a forward position and then open the motor throttle. This is accomplished merely by pushing the lever 124 forwardly to and then beyond the position shown in solid lines in Figs. 2 and 3. As the lever 124 is advanced, the shaft 40 and thus the gear sectors 46 and 48 are rotated in a forward direction. The arrangement is such that the gear sector 46 first serves to actuate the pinion 76 for operating the gear shift mechanism of the motor and then the gear sector 48 functions to rotate the pinion 100 and open the motor throttle. When the lever 124 is returned toward the neutral position, the gear sector 48 first serves to cause the motor throttle to be closed to an idling position and then the sector 46 functions to actuate the pinion 76 in a manner which causes the motor shift mechanism to be returned to a neutral position. When the lever 124 is pulled rearwardly from the broken line neutral position shown in Fig. 2, the gear sector 46 first actuates the motor shift mechanism to a reverse position and then the internal teeth 106 of the gear sector 48 serve to actuate the throttle control pinion 100 so as to open the throttle. Of course this sequence of operation is reversed when the lever 124 is returned to the neutral position.

As indicated above there are many cases when it is desired to operate the motor throttle while leaving the motor gear shift mechanism in the neutral position. In order to accomplish this, the lever 124 is first located in the neutral position so that the rectangular or square section 68 of the shaft 40 registers with the square aperture 134 in the plate 132. Since the neutral position of the lever 124 may vary for different motors, the plate member 132 is adjustable in the manner described above so that the aperture 134 may be orientated properly for the particular motor with which the control apparatus is to be used. After the lever 124 has been located in the neutral position, the lever is shifted in the plane containing the axis of the shaft 40 to the position shown in Fig. 4 so that the square section 50 of the shaft becomes disengaged from the gear sector 46 and the square section 68 of the shaft passes entirely through the plate 132. Then the lever 124 is rotated or advanced about the axis of the shaft 40 and this causes the throttle to be actuated in the manner described above while the gear sector 46 remains stationary so that the gear shift mechanism of the motor is not operated. It is to be noted that after the lever 124 has been advanced slightly, the square portion 68 of the shaft will be out of alignment with the aperture 134 in the plate member 132 so that the shaft will remain in the axially shifted position shown in Fig. 4 until it is again returned to the neutral position. This arrangement positively prevents shifting of the gear mechanism until the throttle has been reduced to a safe or idling speed.

While the preferred embodiment of the present invention has been shown and described herein, it is obvious that many structural details may be changed without departing from the spirit and scope of the appended claims.

The invention is claimed as follows:

1. A control apparatus for a gear shift device and a throttle device of the type described comprising rotatably and axially shiftably supported shaft means, first and second actuating members disposed on said shaft means and respectvely operatively connectable with said throttle and shift devices for operating said devices during rotatable movement of said actuating members, said shaft means being axially shiftable to and from first and second positions, cooperable means on said shaft means and said first and second members for retaining both of said members for rotation with said shaft means when the shaft means is in said first position and for retaining only said second member for rotation with the shaft means when said shaft means is in said second position, and means connected with said shaft means for rotatably and axially shifting said shaft means.

2. A control apparatus, as defined in claim 1, which includes means engageable with said shaft means for retaining said shaft means against axial movement until said shaft means has been rotatably positioned in a predetermined manner.

3. A control apparatus for a reversible gear shift device and a throttle device of a motor comprising rotatably and axially shiftably supported shaft means, first and second gear means associated with said shaft means and selectively rotatable in opposite directions for respectively operating the gear shift device to and from neutral, forward and reverse positions and for operating the throttle device, said shaft means being axially shiftable to and from first and second positions, cooperable means on said shaft means and said first and second gear means for retaining both of said gear means for rotation with the shaft means when the shaft means is in said first position and for retaining only said second gear means for rotation with the shaft means when the shaft means is in said second position, and a lever connected with said shaft means and supported for rotative movement about the axis of said shaft means and for pivotal movement in a plane containing said axis for selectively rotatably and axially shifting said shaft means.

4. A control apparatus, as defined in claim 3, wherein said first gear means includes a gear sector disposed on said shaft and having a toothed segment and arcuate surfaces extending oppositely from the toothed segment, and a rotatably supported pinion operatively connectable with the gear shift device and including a toothed segment cooperable with said first mentioned toothed segment and arcuate surfaces extending oppositely from said last mentioned toothed segment and respectively complementary to and engageable with said first mentioned arcuate surfaces for locking the pinion against rotation upon rotation of the gear sector sufficiently to disengage said toothed segments.

5. A control apparatus, as defined in claim 3, wherein said second mentioned gear means comprises a gear sector having an arcuate slot defined by radially outwardly and inwardly facing surfaces having arcuately offset toothed segments, and a pinion operatively connectable with the throttle device and disposed within said slot and operatively engageable with said toothed segments upon rotative movement of the gear sector in opposite directions.

6. A control apparatus for operating first and second devices comprising rotatable shaft means, first and second actuating means associated with said shaft means and respectively operatively connectable with said first and second devices to be operated for actuating first and second devices upon rotative movement of said first and second actuating means, said first and second actuating means and said shaft means being relatively shiftable axially of said shaft means to and from first and second relative positions, cooperable means on said shaft means and said first and second actuating means for non-rotatably connecting said shaft means and said first and second actuating means in said first position and for retaining only said second actuating means for rotation with the shaft means when said shaft means and said actuating means are in said second position, and means connected with said shaft means for rotatably and axially shifting said shaft means.

7. A control apparatus, as defined in claim 6, wherein each of said actuating means includes a peripherally toothed gear, said apparatus including first and second elongated motion transmitting elements respectively connectable with said first and second devices and having longitudinally spaced protuberance means respectively meshing with said gears of said first and second actuating means.

8. A control apparatus, as defined in claim 7, which includes a first pair of guide means respectively extending along opposite peripheral portions of said gear of said first actuating means selectively for receiving said first elongated motion transmitting, so that apparatus may be readily adapted for different requirements of different installations, and a second pair of guide means respectively disposed along opposite peripheral portions of said gear of the second actuating means for selectively receiving said second elongated motion transmitting element.

9. A control apparatus, as defined in claim 6, wherein said shaft means is rotatably movable to and from a neutral position, said apparatus including means for restraining said shaft means and said actuating means against relative axial movement whenever said shaft means is displaced from said neutral position.

10. A control apparatus, as defined in claim 6, which includes housing means substantially enclosing said actuating means and axially and rotatably shiftably supporting said shaft means, said means connected with said shaft means for rotatably and axially shifting the shaft means including a generally radially projecting lever pivotally connected with said shaft means for movement in a plane substantially including the rotative axis of said shaft means, and support means mounted on said housing means and carrying said lever for rotation about said axis and also pivotally supporting said lever at a location spaced radially outwardly from said shaft means for pivotal movement in said plane.

References Cited in the file of this patent
UNITED STATES PATENTS

| | | |
|---|---|---|
| 2,321,098 | Morse | June 8, 1943 |
| 2,386,391 | Fike et al. | Oct. 9, 1945 |
| 2,495,536 | Morse | Jan. 24, 1950 |
| 2,552,001 | Dugas | May 8, 1951 |
| 2,588,650 | Morse | Mar. 11, 1952 |
| 2,804,782 | Erxleben | Sept. 3, 1957 |